(12) United States Patent
Peng et al.

(10) Patent No.: US 11,132,304 B2
(45) Date of Patent: Sep. 28, 2021

(54) DATA ACCESSING DEVICE AND METHOD

(71) Applicant: Realtek Semiconductor Corporation, Hsinchu (TW)

(72) Inventors: Zuo-Hui Peng, Suzhou (CN); Chao-Ming Li, Suzhou (CN); Qin Zhang, Suzhou (CN); Zhi-Lin Wu, Kunshan (CN); Bi-Xing Ye, Nanjing (CN)

(73) Assignee: REALTEK SEMICONDUCTOR CORPORATION, Hsinchu (TW)

( * ) Notice: Subject to any disclaimer, the term of this patent is extended or adjusted under 35 U.S.C. 154(b) by 225 days.

(21) Appl. No.: 16/177,578

(22) Filed: Nov. 1, 2018

(65) Prior Publication Data

US 2019/0129866 A1    May 2, 2019

(30) Foreign Application Priority Data

Nov. 1, 2017 (CN) .......................... 201711058514.2

(51) Int. Cl.
*G06F 12/14* (2006.01)
*G06F 21/79* (2013.01)
(Continued)

(52) U.S. Cl.
CPC ...... *G06F 12/1408* (2013.01); *G06F 12/0868* (2013.01); *G06F 12/1441* (2013.01);
(Continued)

(58) Field of Classification Search
CPC .. G06F 12/1408; G06F 12/1441; G06F 21/79; G06F 21/602; G06F 21/64;
(Continued)

(56) References Cited

U.S. PATENT DOCUMENTS

| | | | |
|---|---|---|---|
| 6,314,416 B1 * | 11/2001 | Schiefele | G06F 15/7867 706/60 |
| 2004/0073765 A1 * | 4/2004 | Arimilli | G06F 12/0653 711/202 |

(Continued)

FOREIGN PATENT DOCUMENTS

| | | |
|---|---|---|
| CN | 101051892 A | 10/2007 |
| CN | 101086769 A | 12/2007 |

(Continued)

*Primary Examiner* — Quazi Farooqui
(74) *Attorney, Agent, or Firm* — Locke Lord LLP; Tim Tingkang Xia, Esq.

(57) ABSTRACT

A data accessing device to access a storage element that stores encrypted data is provided. The data accessing device includes a processing circuit, a storage controller, a decrypting circuit and a combinational logic circuit. The processing circuit generates an accessing address and decryption related information according to an accessing command. The storage controller receives the accessing address and accesses corresponding encrypted data accordingly. The decrypting circuit receives the decryption related information and a pre-stored key to generate a decrypting cipher accordingly. The combinational logic circuit receives the corresponding encrypted data and the decrypting cipher to perform a logic operation to generate decrypted data accordingly that enables the processing circuit to access the decrypted data.

9 Claims, 2 Drawing Sheets

(51) Int. Cl.
*G06F 21/60* (2013.01)
*G06F 12/0868* (2016.01)
*G06F 21/64* (2013.01)
*H04L 9/08* (2006.01)

(52) U.S. Cl.
CPC ............ *G06F 21/602* (2013.01); *G06F 21/64* (2013.01); *G06F 21/79* (2013.01); *H04L 9/0894* (2013.01); *G06F 2212/1052* (2013.01); *G06F 2212/2142* (2013.01); *G06F 2212/402* (2013.01)

(58) Field of Classification Search
CPC ......... G06F 12/0868; G06F 2212/1052; G06F 2212/402; G06F 2212/2142; G06F 12/14; G06F 21/60; H04L 9/0894; H04L 9/0866; H04L 9/0897; H04L 9/3239
See application file for complete search history.

(56) References Cited

U.S. PATENT DOCUMENTS

| | | | |
|---|---|---|---|
| 2004/0088552 A1* | 5/2004 | Candelore | H04N 7/1675 713/185 |
| 2011/0087898 A1* | 4/2011 | Williams | G06F 21/31 713/193 |
| 2014/0164793 A1* | 6/2014 | Hadley | G06F 21/72 713/193 |
| 2018/0276392 A1* | 9/2018 | Hoogerbrugge | G06F 21/602 |
| 2019/0115078 A1* | 4/2019 | Kim | G11C 29/028 |

FOREIGN PATENT DOCUMENTS

| | | |
|---|---|---|
| CN | 102436423 A | 5/2012 |
| CN | 103258172 A | 8/2013 |
| TW | 201717100 A | 5/2017 |

\* cited by examiner

DATA ACCESSING DEVICE AND METHOD

RELATED APPLICATIONS

This application claims priority to China Application Serial Number 201711058514.2, filed Nov. 1, 2017, which is herein incorporated by reference.

BACKGROUND

Field of Invention

The present invention relates to a data accessing technology. More particularly, the present invention relates to a data accessing device and a data accessing method.

Description of Related Art

In recent years, along with the rapid development of Internet of Things (IoT) technology, more and more related applications are generated. In the electronic devices equipped with the IoT technology, external storage elements such as flash memories are disposed for storing encrypted data. However, giving considerations to both the security of the storage in the memory and the efficiency of the memory access at the same time is not an easy task. When the design increases the security of the memory and the data therein, additional processing time is required to perform decryption, and that increases the rate of cache-miss. Accordingly, the penalty of such memory access becomes heavier.

Accordingly, what is needed is a data accessing device and a data accessing method for addressing the issues mentioned above.

SUMMARY

An aspect of the present invention is to provide a data accessing device to access a storage element that stores encrypted data. The data accessing device includes a processing circuit, a storage controller, a decrypting circuit and a combinational logic circuit. The processing circuit is configured to generate an accessing address and decryption related information according to an accessing command. The storage controller is configured to receive the accessing address and access corresponding encrypted data from the storage element according to the accessing address. The decrypting circuit is configured to receive the decryption related information and a pre-stored key to generate a decrypting cipher according to the decryption related information and the pre-stored key. The combinational logic circuit is configured to receive the corresponding encrypted data and the decrypting cipher to perform a logic operation to generate decrypted data according to the corresponding encrypted data and the decrypting cipher that enables the processing circuit to access the decrypted data.

Another aspect of the present invention is to provide a data accessing method used in a data accessing device to access a storage element that stores encrypted data. The data accessing method includes the steps outlined below. An accessing address and decryption related information are generated according to an accessing command by a processing circuit. The accessing address is received and corresponding encrypted data is accessed from the storage element according to the accessing address by the storage controller. The decryption related information and a pre-stored key are received to generate a decrypting cipher by a decrypting circuit according to the decryption related information and the pre-stored key. The corresponding encrypted data and the decrypting cipher are received to perform a logic operation to generate decrypted data according to the corresponding encrypted data and the decrypting cipher by a combinational logic circuit that enables the processing circuit to access the decrypted data.

These and other features, aspects, and advantages of the present invention will become better understood with reference to the following description and appended claims.

It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the embodiment, with reference made to the accompanying drawings as follows.

DETAILED DESCRIPTION

Figure 1:
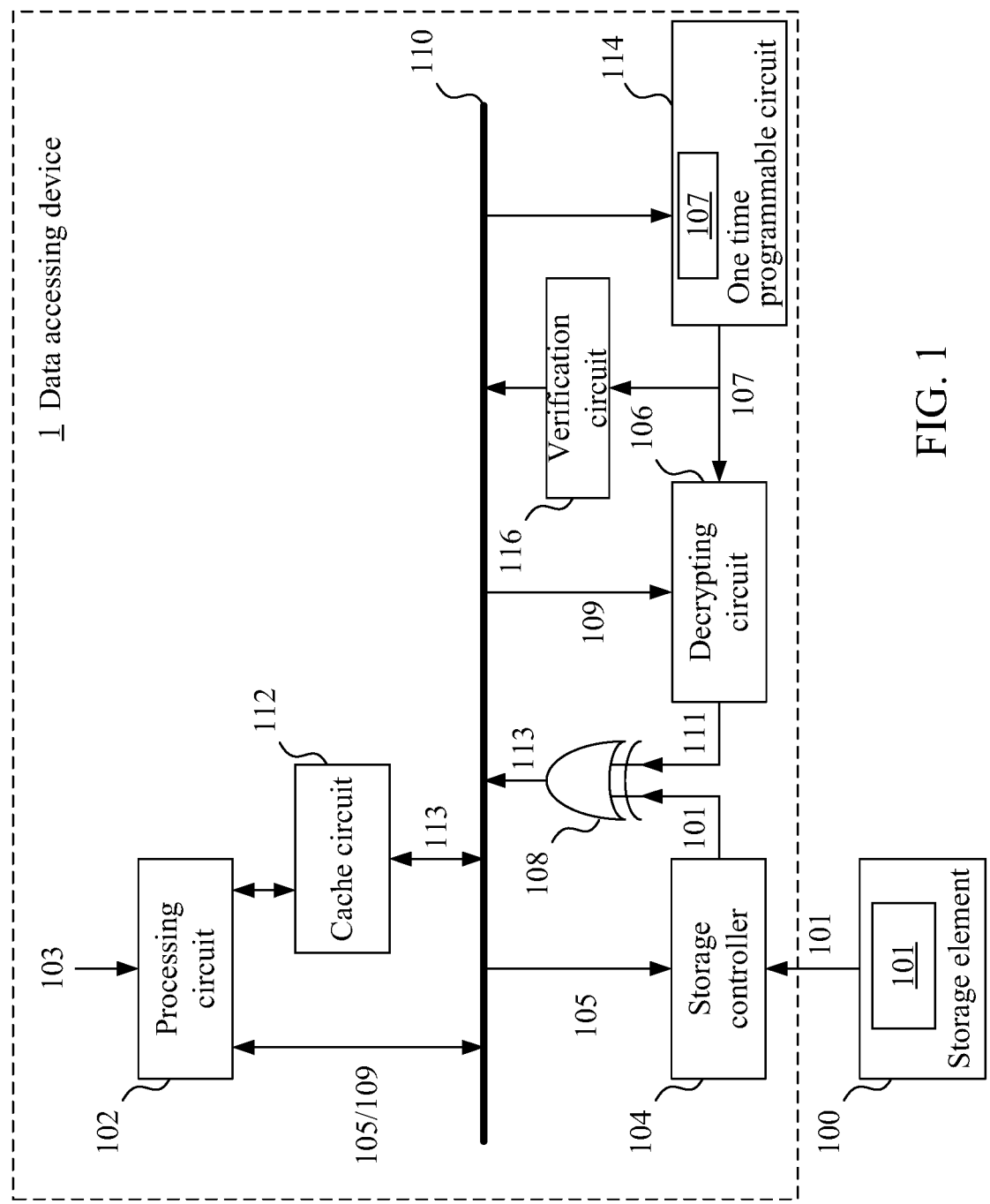
FIG. 1 is a block diagram of a data accessing device in an embodiment of the present invention.

Reference is made to FIG. 1. FIG. 1 is a block diagram of a data accessing device 1 in an embodiment of the present invention.

In an application scenario, the data accessing device 1 can be such, but not limited to an IoT chip and can be used to access the storage element 100. In different embodiments, the storage element 100 can be either disposed outside of the data accessing device 1 or selectively integrated on a same chip with the data accessing device 1.

The storage element 100 can be such as, but not limited to a flash memory, a synchronous dynamic random-access memory (SDRAM) or a double data rate SDRAM (DDR SDRAM) and is configured to store a plurality of pieces of encrypted data 101.

In other embodiments, the data accessing device 1 and the storage element 100 can be implemented by other hardware components and are not limited to the embodiments described above.

The data accessing device 1 includes a processing circuit 102, a storage controller 104, a decrypting circuit 106 and a combinational logic circuit 108.

In an embodiment, the processing circuit 102, the storage controller 104, the decrypting circuit 106 and the combinational logic circuit 108 are electronically coupled to a bus 110. Signal and data transmission can be performed among each of the circuits through the bus 110.

The processing circuit 102 can be such as, but not limited to a central processing unit (CPU) and is configured to receive an accessing command 103. In an embodiment, the data accessing device 1 further includes a network circuit and an input circuit (not illustrated). The accessing command 103 can be received through the network by the network circuit or through the input circuit (not illustrated) implemented by such as, but not limited to a touch circuit or a keyboard.

In an embodiment, the data accessing device 1 includes a cache circuit 112. When the processing circuit 102 receives the accessing command 103, the processing circuit 102 searches for corresponding data in the cache circuit 112. When the corresponding data is already accessed by the processing circuit 102 before, the corresponding data is stored in the cache circuit 112 such that the processing circuit 102 can directly access the corresponding data from the cache circuit 112.

When the cache circuit 112 does not have the corresponding data such that the processing circuit 102 can not access the corresponding data from the cache circuit 112, the processing circuit 102 generates an accessing address 105 and decryption related information 109 according to the accessing command 103.

The storage controller 104 is configured to receive the accessing address 105. Corresponding to different implementations of the storage element 100, the storage controller 104 can be such as, but not limited to a flash memory controller, a SDRAM controller or a DDR SDRAM controller. The accessing address 105 is the physical address corresponding to the data stored in the storage element 100. The storage controller 104 further accesses the corresponding encrypted data 101 from the storage element 100 according to the accessing address 105.

The decrypting circuit 106 is configured to receive a pre-stored key 107 and the decryption related information 109 to generate a decrypting cipher 111 according to the pre-stored key 107 the decryption related information 109.

In an embodiment, the data accessing device 1 further includes a one time programmable circuit 114 configured to store the pre-stored key 107. By using the one time programmable circuit 114 to store the pre-stored key 107 such that the one time programmable circuit 114 can only be read by the decrypting circuit 106 when the decrypting cipher 111 is required, the modification of the key or the condition that the key is stolen can be avoided. As a result, the security is high. However, in other embodiments, other storage methods can be used to store the pre-stored key 107. The present invention is not limited thereto.

In an embodiment, after the pre-stored key 107 is burned into the one time programmable circuit 114, the processing circuit 102 is not able to directly access the pre-stored key 107. As a result, the data accessing device 1 can selectively include a verification circuit 116 configured to perform a checksum test on the pre-stored key 107 to verify the accuracy of the pre-stored key 107 that is burned in the one time programmable circuit 114 such that the processing circuit 102 can read the verification result.

Based on the encryption method of the encrypted data 101, the decryption related information 109 includes such as, but not limited to the accessing address 105, fixed information or pre-generated random information.

In an embodiment, the pre-stored key 107 and the decryption related information 109 described above are both related to the encryption procedure of the encrypted data 101. For example, the encrypted data 101 is encrypted according to the pre-stored key 107 with the accessing address 105, the fixed information or the pre-generated random information during the encryption procedure. As a result, when the encrypted data 101 is about to be decrypted, the decrypting cipher 111 generated by the decrypting circuit 106 would be different according to different encrypted data 101 encrypted based on the accessing address 105 or the random information. In different embodiments, all or part of the accessing address 105 can be used when the accessing address 105 is used as the information during the encryption and the decryption.

In another example, the pre-stored key 107 and the fixed information can be used to perform encryption to generate the encrypted data 101. Under such a condition, when the encrypted data 101 is about to be decrypted, the decrypting cipher 111 generated by the decrypting circuit 106 for different encrypted data 101 would be the same.

Furthermore, the combinational logic circuit 108 is configured to receive the encrypted data 101 and the decrypting cipher 111 to perform a logic operation to generate decrypted data 113 according to the encrypted data 101 and the decrypting cipher 111 to allow the processing circuit 102 to access the decrypted data 113. In an embodiment, the combinational logic circuit 108 transmits the decrypted data 113 to the cache circuit 112 and stores the decrypted data 113 therein such that the processing circuit 102 is able to access the decrypted data 113. In an embodiment, the combinational logic circuit 108 is an exclusive or gate. However, the present invention is not limited thereto.

In an embodiment, the access method of the cache circuit 112 can be zero-word first or desired-word first. More specifically, when the cache circuit 112 is accessed by using the zero-word first method, the first word that is read is the beginning of the data. Under such a condition, no additional information is required for the decrypting circuit 106 to generate the correct decrypting cipher 111 based on the decryption related information 109 such that the combinational logic circuit 108 can perform decryption accordingly.

However, when the cache circuit 112 is accessed by using the desired-word first method, the actual beginning section of the data corresponds to a predetermined word, e.g. the second word, of the read data. Under such a condition, besides the decryption related information 109, a word offset corresponding to the cache circuit 112 is required for the decrypting circuit 106 to calibrate the order of the words of the correct decrypting cipher 111 such that the combinational logic circuit 108 can perform logic operation, generate the decrypted data 113 and store the decrypted data 113 to the cache circuit 112 accurately.

In an embodiment, the encrypted data 101 can be encrypted and stored by a remote host and the content of the encrypted data 101 includes commands. The data accessing device 1 can execute corresponding steps after the commands are retrieved.

It is appreciated that when the storage controller 104 accesses the encrypted data 101 from the storage element 100, the decrypting circuit 106 can generate the decrypting cipher 111 according to the pre-stored key 107 and the decryption related information 109 simultaneously.

As a result, in an embodiment, the time length that the decrypting circuit 106 generates the decrypting cipher 111 is smaller than or equal to the time length that the storage controller 104 access the encrypted data 101. The data accessing device 1 can access the encrypted data 101 and generate the decrypting cipher 111 at the same time without additional clock cycles. The encrypted data 101 can be decrypted quickly.

The above embodiments are described by using examples of storage element 100 storing encrypted data. In an embodiment, when the storage element 100 stores the data that is not encrypted and the combinational logic circuit 108 is implemented by the exclusive or gate, the decrypting circuit 106 can directly output a word that is all zero to the combinational logic circuit 108. Under such a condition, the decrypting circuit 106 operates as a bypass circuit such that the combinational logic circuit 108 directly outputs the data accessed from the storage element 100. As a result, the data accessing device 1 of the present invention can be used whether the storage element 100 stores encrypted data or data that is not encrypted.

Figure 2:
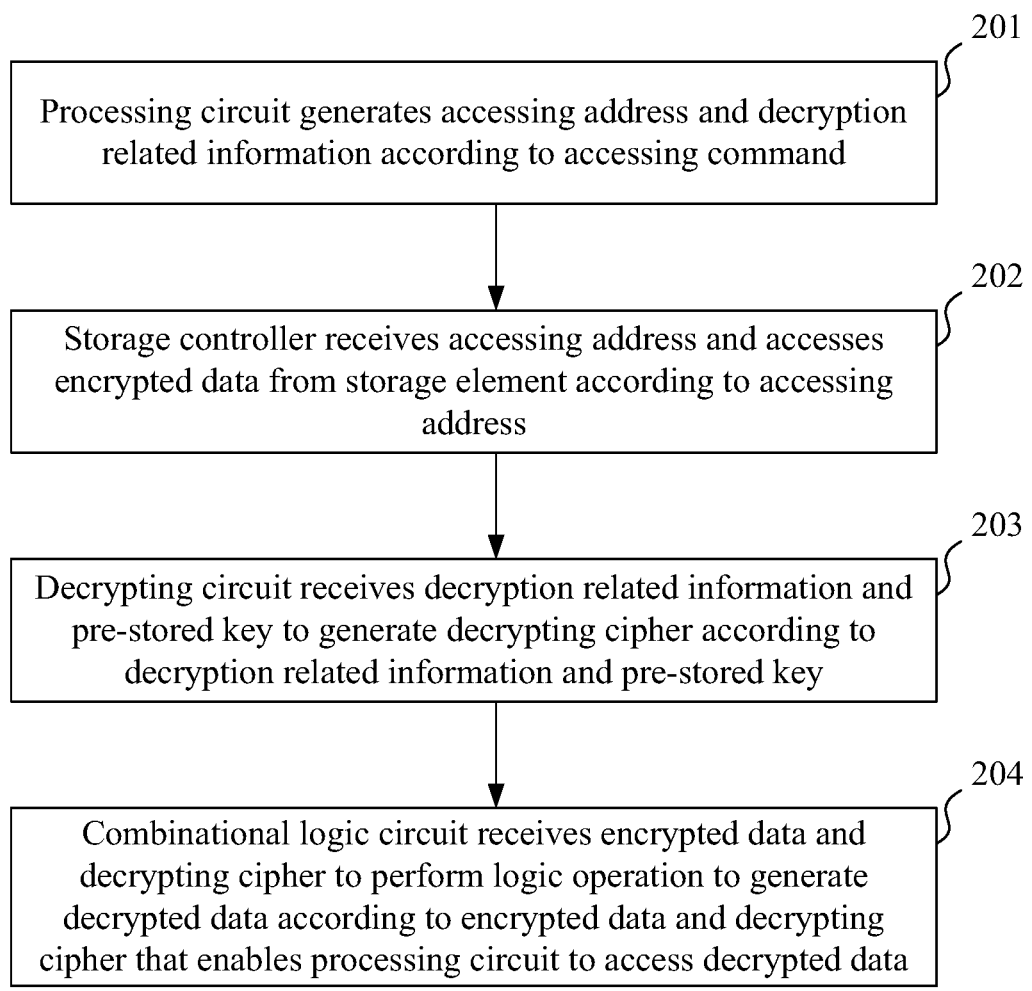
FIG. 2 is a flow chart of a data accessing method in an embodiment of the present invention.

Reference is now made to FIG. 2. FIG. 2 is a flow chart of a data accessing method 200 in an embodiment of the present invention. The data accessing method 200 can be used in the data accessing device 1 illustrated in FIG. 1. The data accessing method 200 includes the steps outlined below (The steps are not recited in the sequence in which the steps are performed. That is, unless the sequence of the steps is expressly indicated, the sequence of the steps is interchangeable, and all or part of the steps may be simultaneously, partially simultaneously, or sequentially performed).

In step 201, the accessing address 105 and the decryption related information 109 are generated according to the accessing command 103 by the processing circuit 102.

In step 202, the accessing address 105 is received and the encrypted data 101 is accessed from the storage element 100 according to the accessing address 105 by the storage controller 104.

In step 203, the decryption related information 109 and the pre-stored key 107 are received to generate the decrypting cipher 111 by the decrypting circuit 106 according to the decryption related information 109 and the pre-stored key 107.

In step 204, the encrypted data 101 and the decrypting cipher 111 are received to perform a logic operation to generate decrypted data 113 according to the encrypted data 101 and the decrypting cipher 111 by the combinational logic circuit 108 that enables the processing circuit 102 to access the decrypted data 113.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A data accessing device to access a storage element that stores encrypted data, wherein the data accessing device comprises:
   a processing circuit configured to generate an accessing address and decryption related information according to an accessing command;
   a storage controller configured to receive the accessing address and access corresponding encrypted data from the storage element in response to the accessing address;
   a decrypting circuit configured to receive the decryption related information and a pre-stored key to generate a decrypting cipher according to the decryption related information and the pre-stored key; and
   a combinational logic circuit configured to receive the corresponding encrypted data and the decrypting cipher to perform a logic operation to generate decrypted data according to the corresponding encrypted data and the decrypting cipher that enables the processing circuit to access the decrypted data;
   wherein a first time length that the decrypting circuit generates the decrypting cipher is smaller than a second time length that the storage controller access the corresponding encrypted data.

2. The data accessing device of claim 1, further comprises a cache circuit, wherein the processing circuit is configured to generate the accessing address and the decryption related information when corresponding data is not accessed by the processing circuit from the cache circuit according to the accessing command.

3. The data accessing device of claim 2, wherein the combinational logic circuit transmits the decrypted data to the cache circuit such that the processing circuit access the decrypted data from the cache circuit.

4. The data accessing device of claim 3, wherein the decryption related information includes a word offset corresponding to an accessing method of the cache circuit, the decrypting circuit is configured to calibrate an order or word of the decrypting cipher according to the word offset.

5. The data accessing device of claim 1, wherein the decryption related information includes the accessing address, fixed information or pre-generated random information.

6. The data accessing device of claim 1, further comprising a one-time programmable circuit configured to store the pre-stored key.

7. The data accessing device of claim 1, further comprising a verification circuit configured to perform a checksum test on the pre-stored key.

8. The data accessing device of claim 1, wherein the combinational logic circuit is an exclusive or gate.

9. A data accessing method used in a data accessing device to access a storage element that stores encrypted data, wherein the data accessing method comprises:
   generating an accessing address and decryption related information according to an accessing command by a processing circuit;
   receiving the accessing address and accessing corresponding encrypted data from the storage element in response to the accessing address by a storage controller;
   receiving the decryption related information and a pre-stored key to generate a decrypting cipher by a decrypting circuit according to the decryption related information and the pre-stored key; and
   receiving the corresponding encrypted data and the decrypting cipher to perform a logic operation to generate decrypted data according to the corresponding encrypted data and the decrypting cipher by a combinational logic circuit that enables the processing circuit to access the decrypted data;
   wherein a first time length that the decrypting circuit generates the decrypting cipher is smaller than a second time length that the storage controller access the corresponding encrypted data.

* * * * *